Sept. 24, 1940.    L. A. LAYNE    2,216,038
GRAVEL DUMP BUCKET AND METHOD
Filed Feb. 9, 1939

LESLIE A. LAYNE
INVENTOR
BY R. J. Dearton
Daniel Stryker
ATTORNEYS

Patented Sept. 24, 1940

2,216,038

UNITED STATES PATENT OFFICE 2,216,038

GRAVEL DUMP BUCKET AND METHOD

Leslie A. Layne, Houston, Tex., assignor to The Texas Company, New York, N. Y., a corporation of Delaware Application February 9, 1939, Serial No. 255,386

9 Claims. (Cl. 166—21)

The invention relates to a means and method of depositing gravel in a well bore about a strainer element which is particularly adapted to deposit the gravel and sections of the strainer element alternately so as to insure a solid pack of gravel about each strainer section and to prevent bridging of the gravel around the strainer.

In the depositing of granular material in well bores to form a filter through which the fluid being produced will flow and particularly where a screen or strainer element is to receive this fluid, difficulty has been encountered in depositing the granular material so as to obtain a solid and compact filter.

In an operation of this sort it is usually necessary to deposit the gravel in the well bore about the strainer element and inasmuch as the annular space around the strainer element in the well bore is relatively small, there is a tendency of the granular material to bridge over so that voids or open spaces occur in the gravel pack. This is particularly true where a long element of strainer or screen is positioned in the well bore. In some instances the strainer element may be as much as 1,000 feet in length.

It is one of the objects of the present invention to provide a means and method of alternately positioning a relatively short section of the strainer element and then placing the gravel thereabout and subsequently positioning another section of the strainer element and in turn depositing gravel about the last positioned section. This procedure may continue until all of the strainer element sections have been positioned and all the gravel deposited about them but the advantage is that the filter too is built up by periodic deposits so that there can be no bridging over for any substantial length.

It is also one of the objects of the invention to deposit a charge of granular material in a well bore about a section of strainer.

It is another object of the invention to utilize the combination of the strainer in the well and a container for granular material so that the material will be dumped from the container when it engages the strainer.

Other and further object of the invention will be readily apparent when the following description is considered in connection with the accompanying drawing, wherein.

The present invention may be practiced in any desired type of well bore, either water, oil or gas and may also be practiced in a well bore where the bore is open hole or where the bore has been cased.

Figure 1:
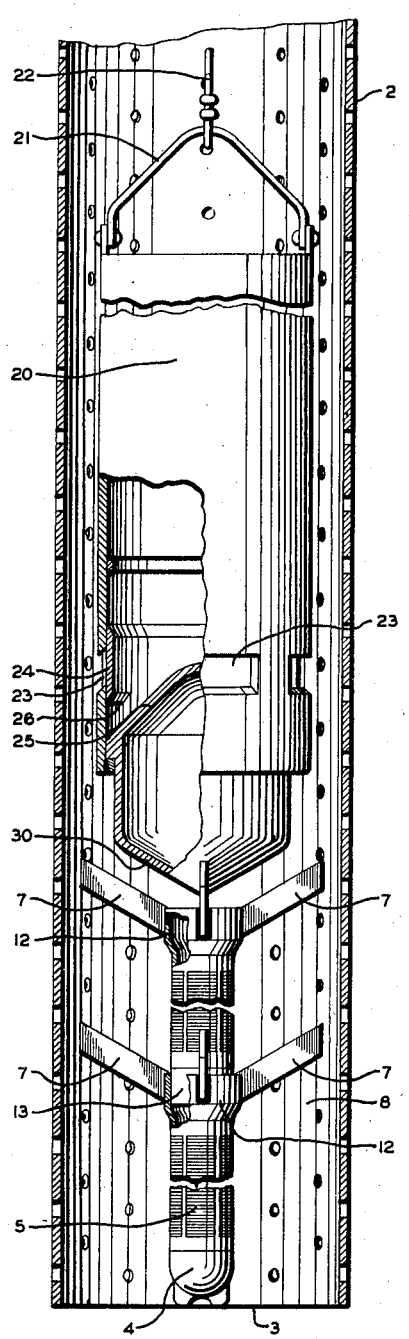
Fig. 1 is a vertical sectional view of a well bore in which the invention is being practiced.

In Fig. 1 the well bore is illustrated diagrammatically by a perforated pipe 2 but for purposes of the invention the wall of this pipe may represent the open hole of the well bore.

In either event the bottom of the well is indicated generally at 3 and a set shoe 4 has been positioned on the well bottom after having been attached to a section 5 of strainer pipe. This section 5 is the lowermost section of a string of strainer or the strainer element as a whole. In order to center this section 5 in the well bore 2 a plurality of wings or guides 7 have been fixed to the strainer so as to hold it substantially centered within the annular space 8 within the well bore 2.

Any desired number of sections, such as 10 of strainer may be added to the section 5. In Fig. 1 a bell 12 is positioned on the upper end of the pipe section 5 and a spigot end 13 is down on the lower end of the section 10. The spigot may be stabbed into the bell as indicated in the drawing in order to connect the sections 5 and 10.

Figure 2:
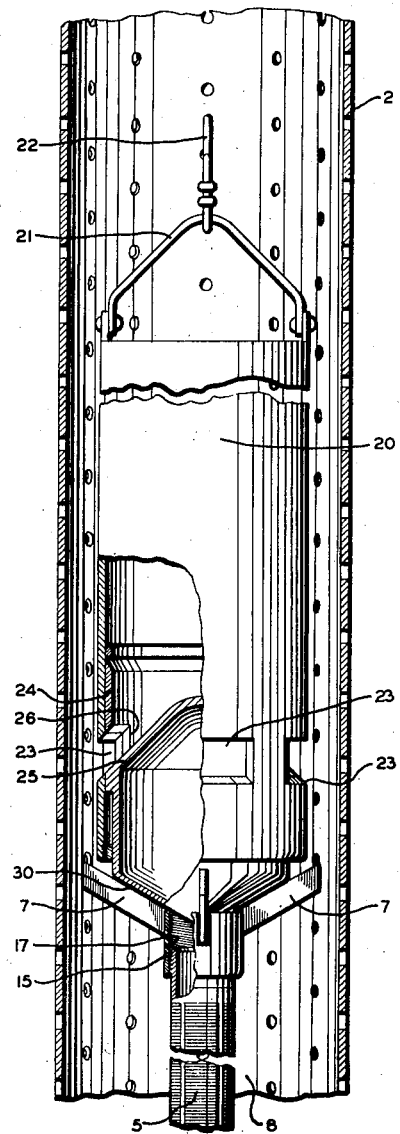
Fig. 2 is a view similar to Fig. 1 but showing the container for the granular material as being in engagement with the strainer so as to discharge the granular material.

Fig. 2 shows a slight modification of this bell and spigot by illustrating a coupling 15 as threaded on to the upper end of the pipe section 5 and this coupling is threaded internally at 17, which threads will receive the complementary threaded lower end of the pipe section 10.

A container for gravel is illustrated generally at 20 and may be of any desired shape, size or configuration, depending upon the circumstances where it is to be used. This container has a bail 21 which is connected to a cable or other means 22 by which the container or bucket may be raised and lowered in the well bore. This bucket is of particular construction in that it has a plurality of discharge ports 23 disposed around the periphery thereof and these ports are normally covered by a sleeve 24 which is fixed to the base 25. A plurality of openings 26 are arranged in this sleeve so that they will move into alinement with the discharge ports as seen in Fig. 2 when the granular material is to be discharged from the bucket. If desired suitable shear pins or other means may be provided to prevent the inadvertent movement of the base 25.

In practicing the invention, to discharge the granular material a bucket will be lowered so that the tapered base 30 will engage the upper end of the strainer section and the inclined wings will guide the bucket to centered position. The weight of the granular material in the bucket will be supported on the bottom or base when it engages the pipe and wings and the cylindrical portion may then continue to move down. In this manner the ports 23 and openings 26 will be moved into alinement as seen in Fig. 2 so as to allow the granular material to discharge.

In practicing the invention generally the pipe section 5 will be lowered into the well bore in any desired manner. The wings 7 will hold it substantially centered either in the well bore or the perforated pipe.

The container or bucket 20 is then filled with a predetermined amount of gravel to sufficiently fill the annular space 8 around the pipe section 5. The bucket is then lowered into the well bore so that the bottom thereof engages the upper end of the pipe section, the ports are opened and the granular material will move out by gravity so as to settle down around the strainer section. In this manner the gravel has but a short distance to travel from the time it is discharged from the container until it arrives at its final position in forming the filter or gravel pack in the well bore. There is little or no opportunity for the granular material to clog or bridge over in the well bore.

It should be noted that the base 25 of the bucket is tapered so that it will fit into the open upper end of the pipe section. This protects the pipe or strainer section against the entry of granular material.

The bucket will then be retrieved from the well and another section of strainer such as 10 lowered into the well and connected to the section 5. Another charge of granular material is then introduced to follow after the last section of strainer. This procedure is continued by the alternate positioning of the strainer and the depositing of the charge of gravel until a strainer element of the desired length and a filter pack of the desired elevation is formed in the well bore.

If the well bore is clean and the walls firm so that caving is not expected, the entire strainer may be inserted and the gravel deposited by repeated trips of the dump bucket. The manipulation of the bucket by a wire line allows a maximum of speed of operation.

What is claimed is:

1. A method of depositing granular material in a well bore about a strainer element comprising the steps of positioning a section of the strainer element in the well bore, protecting the upper open end thereof against the entry of granular material and depositing granular material in the bore about the periphery of the section, inserting another section of the strainer element, and protecting and depositing granular material about said last section.

2. A method of preventing the bridging of granular material being deposited in a well bore about a strainer which comprises sequentially placing a section of the strainer, protecting the top thereof against the entry of granular material, depositing granular material about the section to substantially the elevation of the top thereof, and repeating the cycle of steps as additional sections of strainer are added.

3. A method of depositing granular material in a well bore about a strainer element comprising the steps of positioning a section of the strainer element in the well bore, protecting the upper open end thereof against the entry of granular material and depositing granular material in the bore about the periphery of the section, inserting another section of the strainer element, and protecting and depositing granular material about said last section where the protecting includes the covering over of the upper end of the section by a carrier for the granular material so that such material is discharged around the section.

4. A method of depositing granular material in a well bore about a strainer element comprising the steps of positioning a section of the strainer element in the well bore, protecting the upper open end thereof against the entry of granular material and depositing granular material in the bore about the periphery of the section, inserting another section of the strainer element, and protecting and depositing granular material about said last section where the depositing is accomplished by lowering a charge of granular material into the well bore which is sufficient to substantially fill the well bore about the section and to an elevation adjacent the top of such section.

5. In the gravelling of a well bore the steps of alternately introducing a section of strainer pipe and a charge of granular material so that a solid pack of granular material is progressively formed about the strainer as such strainer is positioned.

6. An apparatus for depositing granular material in a well bore including a container, discharge ports adjacent the base thereof, a bottom in said container, means on said bottom to normally cover said ports, said bottom being movable relative to said container to uncover said ports, a strainer in the well bore, sloping guide wings on the top of said strainer, said wings being adapted to center the strainer in the bore and to be engaged by said bottom so as to direct the bottom into position to close the upper end of said strainer whereby, as the container moves downwardly, said bottom will uncover said ports to discharge granular material about the strainer.

7. A method of depositing granular material in a well bore about a strainer element comprising the steps of positioning a section of the strainer element in the well bore, protecting the upper open end thereof against the entry of granular material and depositing granular material in the bore about the periphery of the section, inserting another section of the strainer element, and protecting and depositing granular material about said last section, wherein the granular material is lowered into the well bore in a container and released approximate the elevation of its final position.

8. A method of depositing granular material in a well bore about a strainer element comprising the steps of positioning a section of the strainer element in the well bore, protecting the upper open end thereof against the entry of granular material and depositing granular material in the bore about the periphery of the section, inserting another section of the strainer element, and protecting and depositing granular material about said last section, wherein the granular material is lowered by a wire line into the well bore in a container and released approximate the elevation of its final position.

9. An apparatus for depositing granular material in a well bore around a strainer comprising a container adapted to be lowered into said well bore, discharge ports near the base thereof, a bottom member within and slidable vertically with respect to said container, means on said bottom member for normally covering said ports, guide means on the upper end of said strainer for centering said strainer within said bore, said guide means comprising upwardly and outwardly sloping members adapted to be engaged by said bottom member to guide said member into position to close the upper end of said strainer, the arrangement being such that when said bottom member engages said strainer said member will slide upwardly within said container to uncover said ports to discharge said granular material around said strainer.

LESLIE A. LAYNE.